United States Patent
Follesa et al.

(10) Patent No.: US 7,901,008 B2
(45) Date of Patent: Mar. 8, 2011

(54) ACTUATING DEVICE FOR ADJUSTING AND/OR REMOVING A HEAD RESTRAINT TAKING INTO CONSIDERATION FEDERAL MOTOR VEHICLE SAFETY STANDARD 202A (FMVSS 202A)

(75) Inventors: Roberto Follesa, Braunschweig (DE); Peter Schmuda von Trzebiatowski, Schöppenstedt (DE)

(73) Assignee: Volkswagen AG, Wolfsburg (DE)

( * ) Notice: Subject to any disclaimer, the term of this patent is extended or adjusted under 35 U.S.C. 154(b) by 115 days.

(21) Appl. No.: 12/325,455

(22) Filed: Dec. 1, 2008

(65) Prior Publication Data

US 2009/0079250 A1  Mar. 26, 2009

Related U.S. Application Data

(63) Continuation of application No. PCT/EP2007/004502, filed on May 22, 2007.

(30) Foreign Application Priority Data

Jun. 1, 2006 (DE) .......................... 10 2006 026 029

(51) Int. Cl.
A47C 1/00 (2006.01)
(52) U.S. Cl. ...................................... 297/410; 297/463.1
(58) Field of Classification Search .................. 297/410, 297/463.1
See application file for complete search history.

(56) References Cited

U.S. PATENT DOCUMENTS

| | | | |
|---|---|---|---|
| 4,695,095 A | | 9/1987 | Faust et al. |
| 5,711,579 A | | 1/1998 | Albrecht |
| 5,860,703 A | * | 1/1999 | Courtois et al. ............. 297/410 |
| 5,934,755 A | * | 8/1999 | Halamish ..................... 297/410 |
| 6,655,742 B1 | * | 12/2003 | Ozaki .......................... 297/410 |
| 7,255,401 B2 | * | 8/2007 | Yokoyama et al. .......... 297/410 |
| 2003/0222493 A1 | | 12/2003 | Ozaki |
| 2005/0077772 A1 | * | 4/2005 | Yamada ....................... 297/410 |
| 2005/0212343 A1 | * | 9/2005 | Katahira ...................... 297/410 |
| 2006/0214492 A1 | * | 9/2006 | Hassler et al. ............... 297/410 |

FOREIGN PATENT DOCUMENTS

| | | |
|---|---|---|
| DE | 3436541 C1 | 5/1986 |
| DE | 3636931 C1 | 6/1988 |
| DE | 19523358 A1 | 1/1997 |
| DE | 19757244 A1 | 7/1998 |
| DE | 10236259 A1 | 2/2004 |
| WO | 2007137726 A1 | 12/2007 |

OTHER PUBLICATIONS

International Search Report dated May 22, 2007.
German Search Report dated Feb. 16, 2007.

* cited by examiner

*Primary Examiner* — Laurie K Cranmer

(57) ABSTRACT

A head restraint is guided and at least indirectly held in a frame part of a seat, in particular of a backrest of a motor vehicle seat, via at least one holding element which can be positioned at various height levels relative to the frame part by way of an actuating element. The actuating element interacts with at least one locking element. The actuating element is operated with a first, second, and third operating action. A first operating action of the actuating element permits height adjustment of the head restraint and a second operating action permits removal thereof from the frame part of the seat. The second operating action, for removing the head restraint, can be carried out in parallel with or after a third operating action on at least one blocking member that is integrated in the actuating element.

15 Claims, 1 Drawing Sheet

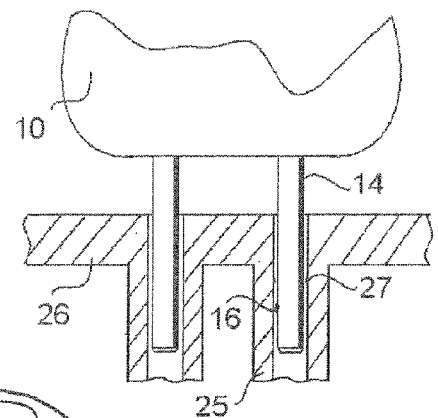
FIG. 1A
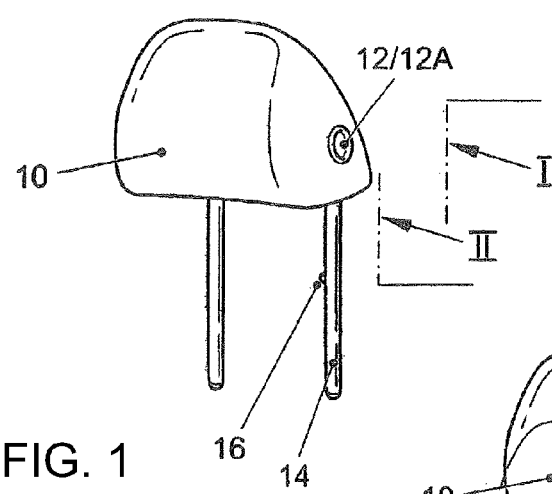
FIG. 1 PRIOR ART
FIG. 2
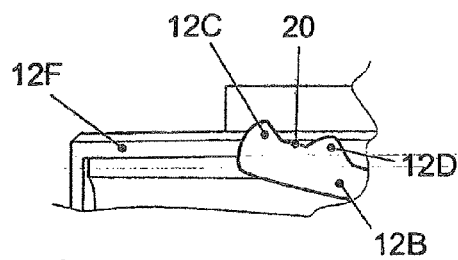
FIG. 3A
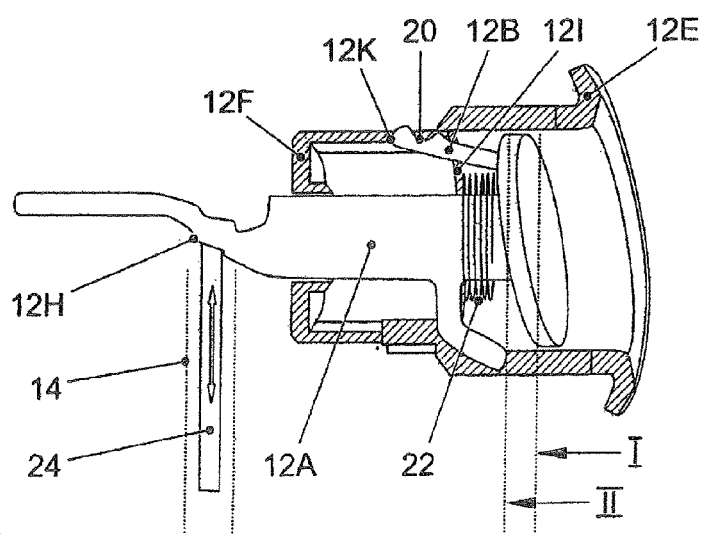
FIG. 3

ACTUATING DEVICE FOR ADJUSTING AND/OR REMOVING A HEAD RESTRAINT TAKING INTO CONSIDERATION FEDERAL MOTOR VEHICLE SAFETY STANDARD 202A (FMVSS 202A)

CROSS-REFERENCE TO RELATED APPLICATIONS

This is a continuation, under 35 U.S.C. §120, of copending international application PCT/EP2007/004502, filed May 22, 2007, which designated the United States; this application also claims the priority, under 35 U.S.C. §119, of German patent application DE 10 2006 026 029.5, filed Jun. 1, 2006; the prior applications are herewith incorporated by reference in their entirety.

BACKGROUND OF THE INVENTION

Field of the Invention

The invention lies in the automotive technology field and automotive safety. More specifically, the present invention relates to a head restraint for a vehicle seat, i.e., to an actuating device for a head restraint which is guided and is at least indirectly held in a frame part of a seat, in particular of a backrest of a motor vehicle seat, via at least one holding element that can be positioned at various height levels relative to the frame part by means of the actuating element. The actuating element interacts with at least one locking element and can be operated, wherein a first operating action of the actuating element permits height adjustment of the head restraint and a second operating action permits removal thereof from the frame part of the seat.

It is generally known to realize height-adjustable head restraints in motor vehicles, in particular passenger vehicles/trucks, via head restraint mounts on vehicle seats. In the case of a straight and also slightly rearwardly inclined backrest, the known head restraints provide the seat user with the possibility of leaning his head against the head restraint. In addition to the adoption of a comfortable sitting posture, the generally known head restraints serve in particular to ensure appropriate support of the head and of the region of the cervical vertebrae of the corresponding person in the event of an accident. A vehicle seat and the associated head restraint therefore have to meet safety aspects in addition to the comfort characteristics. This applies in particular to the generally adjustable height position of the head restraint, which height position is realized predominantly via height-adjustable head restraint mounts.

The head restraint mounts are now distinguished between backrest-integrated release mechanisms and head-restraint-integrated release mechanisms.

Backrest-integrated release mechanisms are described, for example, in German patent DE 34 36 541 C1 and U.S. Pat. No. 4,695,095, in the form of a locking mechanism with an operating element, the displacement guide of which is arranged approximately parallel to the displacement guide of the head-restraint holding hoop which is to be locked in place. As an alternative to this, embodiments are also known, in which the operating element is to be moved essentially at right angles to the axis of the head restraint guide (see in this respect, for example, German patent DE 36 36 931 C1). Such concepts have basically proven worthwhile in practice. However, ever increasing requirements for ease of operation and for structures which are as light as possible mean that head restraints of this type need further optimization.

A head-restraint-integrated release mechanism is described in the commonly assigned German patent DE 195 23 358 C2 and U.S. Pat. No. 5,711,579. There, a locking mechanism for a head restraint which is held at least indirectly in a frame part of a seat, in particular vehicle seat, via at least one holding hoop and can be positioned in different heights by means of an operating element which interacts with at least one locking element, wherein a force transmission element which is arranged within the holding hoop and can be acted upon at one end at least indirectly by the operating element and is operatively connected at least indirectly at the other end to a blocking element which penetrates the holding hoop, is set up to latch in a latching receptacle secured on the seat and is effective as a locking element.

Furthermore, a solution is known from the prior art, as FIG. 1 shows, in which the height adjustment of the head restraint takes place via a first pressure stage and the removal of the head restraint takes place via a second, deeper pressure stage of the same actuating device. That solution was possible in accordance with the previous standard FMVSS No. 202, but can no longer be used in the context of the upgraded version of the standard FMVSS No. 202a (49 CFR Part 571).

The prior art solutions therefore in principle permit the height adjustment and removal of the head restraints using an actuating device.

The new standard FMVSS No. 202a has the requirement that, for the height adjustment and for the removal of head restraints, an actuating device in which both the height adjustment and the removal are possible with a single operating action at the same actuating device must not be provided. The operating action for the height adjustment and the operating action for the removal of a head restraint have to be able to be carried out separately from each other with operating errors avoided.

SUMMARY OF THE INVENTION

It is accordingly an object of the invention to provide an actuating device for a head restraint which overcomes the above-mentioned disadvantages of the heretofore-known devices and methods of this general type and which provides for an actuating device in which height adjustment and removal are possible with unambiguously distinguishable operating actions in order to avoid operating errors.

With the foregoing and other objects in view there is provided, in accordance with the invention, an actuating device for a head restraint with at least one holding element guided and held in a frame part of a seat, in particular in a backrest of a motor vehicle seat, and adjustable for positioning at various height levels relative to the frame part of the seat. The actuating device comprises:

an actuating element interacting with at least one locking element, the actuating element defining a first operating action to permit a height adjustment of the head restraint relative to the frame part of the seat and a second operating action to permit a removal of the head restraint from the frame part of the seat;

at least one blocking member integrated in the actuating element and defining a third operating action;

wherein the actuating element and the blocking member are configured to allow the second operating action for removal of the head restraint to be carried out in parallel with or subsequently to the third operating action.

Owing to the fact that a second operating action for removing the head restraint can be carried out in parallel with or after a third operating action on at least one blocking member, which is integrated in the actuating element and is to be considered to be an additional actuating element, it is ensured that the user does not inadvertently carry out the second operating action, which leads to the option of removing the head restraint, although he merely intended to release the head restraint by means of a first operating action in order to adjust the height of the head restraint.

Before the user undertakes the operating action to remove the head restraint by means of the second operating action, he must always carry out a conscious, further, third operating action on the additionally arranged blocking member of the actuating device.

This is because only the release of the second operating action to be carried out in order to remove the head restraint by means of the third operating action leads to the blocking member being released and permits removal of the head restraint.

In a preferred refinement of the invention, the first operating action is brought about by pressing on a push-button of the actuating element and by overcoming a first pressure stage, and a second operating action is brought about by overcoming a second pressure stage at the push-button, as a result of which a transmission of the movement of the actuating element via an actuating bar within the holding element and therefore a pressure-stage-dependent shifting of a locking element in a holding element takes place.

In a further preferred refinement, the at least one holding element, in particular a head restraint rod, after the first operating action has taken place, can be positioned, in particular latched in position, in a latching unit relative to the frame part by means of the at least one locking element, with the holding element being arranged directly in the frame part or indirectly in at least one guide element.

Furthermore, the actuating element arranged in the head restraint comprises a sleeve and a protective cover which delimits the actuating element from the head restraint and in which the push-button is arranged, the push-button being guided in the sleeve and on the push-button actuating surface of which the first and second operating actions can be carried out.

The first and second operating actions of the push-button act axially via a run-on slope, which is formed opposite the push-button actuating surface, on the upper end of the actuating bar which is guided within the holding element and—as a function of the pressure stage—retracts the locking element at its lower end in relation to the latching unit, which is arranged directly in the frame part or indirectly in the at least one guide element, at least partially, after the first operating action in the first pressure stage and completely, after the second operating action of the second pressure stage, in an axial direction opposed to the first and second operating actions.

In a preferred refinement of the invention, the sleeve of the actuating element has a radially arranged opening via which the third operating action can be carried out on a blocking-member actuating surface, the opening at the same time providing, in the direction of the first and second operating actions of the actuating element, a bearing surface against which the blocking member comes to bear with its end opposite the push-button after the first operating action has taken place and blocks the second operating action.

Finally, it is preferable that, after the operating action has taken place, the push-button is returned with the build up of restoring forces by means of spring elements which are arranged in the region of the actuating bar and/or in the region of the sleeve of the fastening element.

Further preferred refinements of the invention emerge from the remaining features which are mentioned in the dependent claims and from the description of the single exemplary embodiment.

Other features which are considered as characteristic for the invention are set forth in the appended claims.

Although the invention is illustrated and described herein as embodied in actuating device for adjusting a head restraint and head restraint removal taking into consideration Federal Motor Vehicle Safety Standard 202a (FMVSS 202a), it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 1 is a perspective view of a head restraint with an actuating device according to the prior art;

FIG. 1A is a partly sectional view of a head restraint and its mounting to a horizontal bar of a seat frame;

FIG. 2 is a perspective illustration of the head restraint with an actuating device in an exploded illustration;

FIG. 3 is a sectional illustration of the actuating device according to the invention; and FIG. 3A is an enlarged sectional illustration of a blocking member of the actuating device.

DETAILED DESCRIPTION OF THE INVENTION

Referring now to the figures of the drawing in detail and first, particularly, to FIG. 1 thereof, there is illustrated a head restraint 10 according to the prior art. The head restraint 10 has head restraint rods forming holding elements 14. In the exemplary embodiment, a locking element 16 is arranged in the left holding element 14, as seen in the direction of travel. The locking element protrudes radially out of the holding element 14 and permits locking, in particular latching, at a non-illustrated latching unit in relation to a frame part of a backrest.

For the height adjustment, an actuating element 12 is operated. The actuating element retracts the locking element 16 at least partially into the holding element 14 by overcoming a first pressure stage I by means of a first operating action such that the head restraint 10 can be adjusted in height relative to a frame part 25 of the backrest. A backrest frame 26 is diagrammatically illustrated in FIG. 1A. The holding elements 14 are movably guided, and held, within two substantially tubular frame parts 25.

However, after the first operating action has taken place, the locking element 16 remains partially back outside the holding element 14 such that the head restraint 10 cannot be removed because of a restriction 27 which is disposed in/on the frame part 25 in the removal direction.

Only after the second pressure stage II has been overcome and after a corresponding, second operating action at the operating element 12 is the locking element 16 pulled back into the holding element 14 to an extent that allows the restriction 27 in the frame part 25 of the backrest 26 to be overcome and the head restraint 10 to be removed.

According to the new safety standard, the removability of the head restraint 10 and the associated operating action for the removal are to be clearly distinguishable from the operating action of the height adjustment of the head restraint. Possible user operating errors are therefore intended to be prevented from the outset.

FIG. 2 shows, in an exploded illustration, the actuating element 12 which, according to the invention, has an opening 12G in which a blocking member 12B is arranged. The further reference numbers correspond to those used in FIG. 1.

FIG. 2 furthermore shows that the actuating element is a push-button 12A which has already also been implemented according to the prior art and which, in FIGS. 2 and 3 and 3A, has already been actuated, as the first operating action, via a push-button actuating surface 18 with the first pressure stage I being overcome. According to the invention, a further, second operating action with the second pressure stage II being overcome is now possible only by the simultaneous or preceding actuation of the blocking member 12B, as an additional operating component, at a blocking-member actuating surface 20, which can be seen best in FIGS. 3, 3A, via the opening 12G.

It can be seen from FIG. 2 that the actuating element 12 ends at the side surface of the head restraint 10 via a protective cover 12E. In order to operate the blocking member 12B, the body of the head restraint 10 has to be designed in such a manner that an operator can carry out the third operating action in order to release the blocking member 12B, with it being ensured, according to the invention, that the operator can correspondingly deform the body of the head restraint at the designated location, and preferably can press it in to a sufficient depth.

This solution advantageously ensures that the additional element, the blocking member 12B of the actuating element 12, is not visible but can nevertheless be operated.

FIG. 3 shows the actuating element 12 in a section along a central axis, wherein the push-button 12A has already been actuated according to FIGS. 2 and 3A such that the first pressure stage I has already been overcome. As the enlarged illustration of FIG. 3A shows, the blocking member 12B has a first blocking tooth 12C and a second blocking tooth 12D, with the front end of the blocking member 12B forming together with the opening 12G a bearing surface 12K in the direction in which the push-button 12A is shifted on the sleeve 12F.

A further, second operating action in order to overcome the second pressure stage II is therefore no longer possible.

However, the first operating action with the first pressure stage I being overcome has already led, by means of a run-on slope 12H formed on the push-button 12A, to an actuating bar 24 which, in the exemplary embodiment of the head restraint rod 14, is arranged in the holding element being shifted orthogonally with respect to the axially realized direction of movement of the push-button 12A. Suitable devices are arranged at that end of the actuating bar 24 which lies opposite the run-on slope 12H, in order to at least partially pull the locking element 16 back into the head restraint rod 14.

However, as mentioned above, because the locking element 16 is only partially pulled back, removal is not yet possible because of a restriction element in the removal direction of the head restraint 10.

Only the second operating action with the second pressure stage II being overcome leads to a further axial movement of the push-button 12A which, via the run-on slope 12H, shifts the actuating bar 24, as in the first operating action, further in the orthogonal direction with respect to the push-button 12A such that by way of the same means arranged at the end of the actuating bar 24 the locking element 16 is completely retracted in order to permit removal of the head restraint 10.

However, the blocking member 12B has to be actuated beforehand in a third operating action mounted upstream or to be carried out in parallel, by the blocking-member actuating surface 20 being pressed such that the bearing surface 12K no longer comes to bear against the sleeve 12F, and therefore the axial direction of movement of the push-button 12A can be continued.

Of course, in the case of the actuation mounted upstream, the blocking member has to be held in the shifted position in order to be able to carry out the second operating action.

An edge 12I which restricts the movement of the push-button 12A in the axial direction is additionally arranged in the sleeve 12F. At the same time, a spring element 22 is arranged between the edge 12I and the inwardly directed surface of the push-button 12A, the spring element being stressed during the first and/or second operating action such that restoring forces act on the push-button 12A and a return of the push-button 12A can be carried out as soon as the first or second actuating action is finished. A further spring element 22, not illustrated in the figures, can also be arranged on the actuating bar 24 such that the push-button 12A is returned via restoring forces on the actuating bar 24, which restoring forces also act on the push-button 12A via the run-on slope.

FIG. 3A finally shows that, after the second pressure stage II is overcome, the end position of the push-button 12A is secured not only by the edge 12I in the sleeve 12F of the actuating element 12, but that, after the blocking member 12B is actuated, the second blocking tooth 12D comes to bear on the sleeve 12F where it again forms a bearing surface 12K with the sleeve 12F.

This description reveals that the blocking member 12B does, of course, have to be arranged in a sufficiently flexible manner at its fastening point on the push-button 12A, to be precise such that a resetting, which is caused by the material, of the blocking member 12B takes place when the third operating action is withdrawn.

In the solution presented here, the removal of the head restraint 10 requires increased attention, since, in order to remove the head restraint, the operator has to undertake two operating actions, the second and third operating actions in parallel, or the second operating action before the third operating action while holding the blocking member 12B, and therefore the first operating action which regularly has to be carried out for the height adjustment does not in any way lead to an operating error which would possibly permit removal and therefore insufficient fixing in the frame part of the backrest.

The invention claimed is:

1. A head restraint assembly, comprising:
   a head restraint;
   at least one holding element affixed to said head restraint and guided and held in a frame part of a seat;
   at least one locking element projecting from said at least one holding element of said head restraint and functional to adjust and hold said head restraint at various height levels relative to the frame part of the seat;
   an actuating element interacting with said at least one locking element, said actuating element defining a first operating action to permit a height adjustment of said head restraint relative to the frame part of the seat and a second operating action to permit a removal of said head restraint from the frame part of the seat;
   at least one blocking member integrated in said actuating element and being movably disposed for defining a third operating action;

wherein said actuating element and said blocking member are configured to allow the second operating action for removal of the head restraint to be carried out only simultaneously with or subsequently to the third operating action during which said blocking member is moved.

2. The head restraint assembly according to claim 1, wherein said head restraint is mounted to a backrest of a motor vehicle seat.

3. The head restraint assembly according to claim 1, wherein said actuating element includes a push-button and wherein an actuating bar is disposed within the holding element, and wherein the first operating action includes pressing said push-button to overcome a first pressure stage and the second operating action includes overcoming a second pressure stage at the push-button, as a result of which a transmission of a movement of said actuating element via said actuating bar within said holding element brings about a pressure-stage-dependent shifting of said locking element.

4. The head restraint assembly according to claim 1, wherein, in order to adjust the height level of the head restraint, the at least one holding element, after the first operating action has taken place, can be latched in position in a latching unit relative to the frame part by way of the at least one locking element, with the holding element being disposed directly in the frame part or indirectly in the frame part in at least one guide element.

5. The head restraint assembly according to claim 4, wherein the holding element is a head restraint rod.

6. The head restraint assembly according to claim 1, wherein said actuating element is disposed in the head restraint and comprises a sleeve and a protective cover delimiting the actuating element relative to the head restraint and having a push-button disposed therein, said push-button being guided in said sleeve, and said push-button having an actuating surface for carrying out the first and second operating actions.

7. The head restraint assembly according to claim 6, wherein, during the first and second operating actions, the push-button acts axially via a run-on slope, formed opposite said push-button actuating surface on an upper end of the actuating bar, the actuating bar is guided within the holding element and, as a function of the respective pressure stage, retracts the locking element at a lower end thereof in relation to a latching unit, and the latching unit is disposed directly in the frame part or indirectly in the at least one guide element, at least partially, after the first operating action in the first pressure stage and completely, after the second operating action of the second pressure stage, in an axial direction opposed to the first and second operating actions.

8. The head restraint assembly according to claim 6, wherein said sleeve of said actuating element has a radial opening formed therein and enabling the third operating action to be carried out on a blocking-member actuating surface, said opening also providing, in a direction of the first and second operating actions of said actuating element, a bearing surface against which said blocking member comes to bear with an end thereof opposite said push-button after the first operating action has taken place.

9. The head restraint assembly according to claim 1, which comprises a spring element disposed to provide a restoring force for returning a push-button of said actuating element, after one of the first and second operating actions has taken place.

10. The head restraint assembly according to claim 9, wherein said spring elements are disposed in a region of an actuating bar and/or in a region of the sleeve of a fastening element.

11. An actuating device for a head restraint with at least one holding element guided and held in a frame part of a seat, and adjustable for positioning at various height levels relative to the frame part of the seat, the actuating device comprising:
an actuating element interacting with at least one locking element, said actuating element defining a first operating action to permit a height adjustment of the head restraint relative to the frame part of the seat and a second operating action to permit a removal of the head restraint from the frame part of the seat;
at least one blocking member integrated in said actuating element, a movement of said blocking member defining a third operating action;
wherein said actuating element and said blocking member are configured to allow the second operating action for removal of the head restraint to be carried out only simultaneously with or subsequently to the third operating action; and
wherein said actuating element is disposed in the head restraint and includes a sleeve and a protective cover delimiting said actuating element relative to the head restraint and having a push-button disposed therein, said push-button being guided in said sleeve, and said push-button having an actuating surface for carrying out the first and second operating actions.

12. The actuating device according to claim 11, wherein, during the first and second operating actions, the push-button acts axially via a run-on slope, formed opposite said push-button actuating surface on an upper end of the actuating bar, the actuating bar is guided within the holding element and, as a function of the respective pressure stage, retracts the locking element at a lower end thereof in relation to a latching unit, and the latching unit is disposed directly in the frame part or indirectly in the at least one guide element, at least partially, after the first operating action in the first pressure stage and completely, after the second operating action of the second pressure stage, in an axial direction opposed to the first and second operating actions.

13. The actuating device according to claim 11, wherein said sleeve of said actuating element has a radial opening formed therein and enabling the third operating action to be carried out on a blocking-member actuating surface, said opening also providing, in a direction of the first and second operating actions of said actuating element, a bearing surface against which said blocking member comes to bear with an end thereof opposite said push-button after the first operating action has taken place.

14. The actuating device according to claim 11, which comprises a spring element disposed to provide restoring forces for returning the push-button after one or both of the first and second operating actions has taken place.

15. The actuating device according to claim 14, wherein said spring element is disposed in a region of an actuating bar and/or in a region of the sleeve of a fastening element.

* * * * *